J. J. Haley,

Wringer Roll.

No. 1270. Reissued Feb. 4. 1862.

Witnesses:

J. P. Hale Jr.

J. R. Bampton

Inventor:

John J. Haley

UNITED STATES PATENT OFFICE.

JOHN J. HALEY, OF SOUTH DEDHAM, MASSACHUSETTS.

IMPROVED ROLLERS FOR WRINGING-MACHINES.

Specification forming part of Letters Patent No. 34,142, dated January 14, 1862; Reissue No. 1,270, dated February 4, 1862.

*To all whom it may concern:*

Be it known that I, JOHN J. HALEY, of South Dedham, in the county of Norfolk and State of Massachusetts, have invented a new and useful Improvement in Rollers for Wringing-Machines, &c.; and I do hereby declare the same to be fully described in the following specification, and represented in the accompanying drawings, of which—

Figure 1:
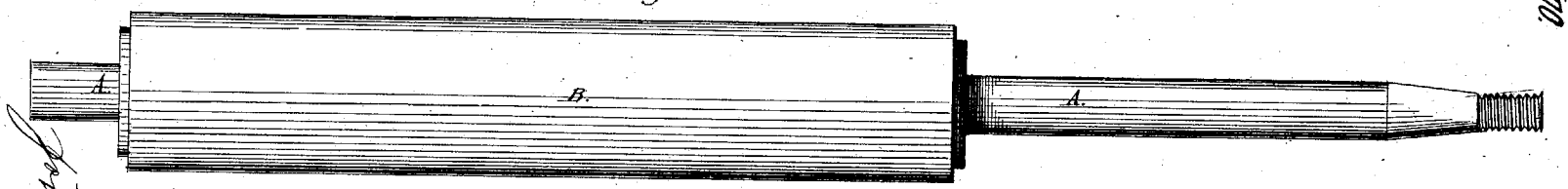
Figure 2:
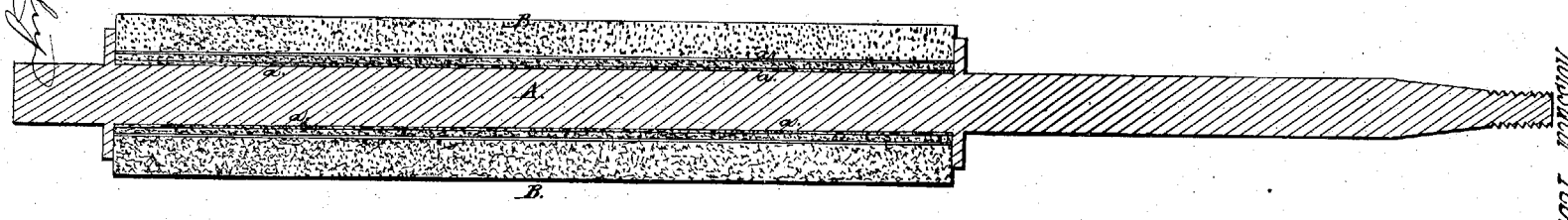

Figure 1 denotes an elevation, and Fig. 2 a central and longitudinal section of a roller constructed in accordance with my invention.

It is a fact well known to manufacturers of wringing-machines wherein the water is to be expressed from articles of clothing after being washed by passing between two rollers which have solid or metallic shafts surrounded by thick tubes of india-rubber, and in many other machines where india-rubber tubes are to be united to metallic shafts, especially where their shafts are small in proportion to the size of the rollers, that it has been found almost impossible to so connect the rubber with the shaft as to prevent the latter from turning around in the former when a great pressure was brought upon the rubber. To effect a firm connection between the two has been the great desideratum, and various expedients have been resorted to. The surface of the shaft has been coated with india-rubber and various other cements and the tubing drawn closely on the shaft; but owing to the chemical action of the iron or metal upon the cement the latter lost its affinity for the metal, and under a small pressure applied to it allowed the tubing to revolve. Others have made the surface of the shaft rough or with teeth. This soon cut holes in the rubber and rendered the tubing loose. Others have formed longitudinal grooves in the shaft and formed corresponding lands in the bore of the tube; but this completely failed of reaching the desired result.

To find a means by which a rubber tube can be firmly attached to a hard metallic surface has been the object of my invention.

In carrying out the same I first cover the metallic shaft A with a coating of varnish, *a*, which on drying rigidly adheres to the same. For this purpose I prefer good copal varnish, which is not only very adhesive and firm, but is not injuriously acted on by the iron. Over this coating, and while the varnish is in a soft state, I closely wind a small twine or cord, *b*, spirally or at right angles to the axis of the shaft; or, instead of the twine, a strip of stout cloth or canvas may be tightly wound. To this I apply one or more coatings, *c*, of india-rubber or other adhesive cement, and allow the same to become dry. Next I apply another coating to the one already dried. Next I give the chamber or bore of the tube B one or more coatings of said rubber or other cement. The rubber tube is next pressed or forced on the shaft, and the whole laid aside to dry.

I have found that when an india-rubber tube is connected with a metallic shaft by the means above described their connection is so firm and enduring that it is impossible to separate them by any ordinary force.

What I claim as my invention, and desire to secure by Letters Patent, is—

The connecting or uniting of india-rubber rollers to metallic shafts by the means and in the manner hereinbefore described.

JOHN J. HALEY.

Witnesses:

R. H. EDDY,

F. P. HALE, JR.